United States Patent
Jeon et al.

(10) Patent No.: US 8,218,102 B2
(45) Date of Patent: Jul. 10, 2012

(54) DISPLAY APPARATUS

(75) Inventors: Jae-Hwan Jeon, Suwon-si (KR);
Jungsoo Ok, Suwon-si (KR);
Chang-Hoi Kim, Gwangmyeong-si (KR)

(73) Assignee: Samsung Electronics Co., Ltd. (KR)

( * ) Notice: Subject to any disclaimer, the term of this patent is extended or adjusted under 35 U.S.C. 154(b) by 363 days.

(21) Appl. No.: 12/562,947

(22) Filed: Sep. 18, 2009

(65) Prior Publication Data
US 2010/0265426 A1   Oct. 21, 2010

(30) Foreign Application Priority Data
Apr. 20, 2009  (KR) .................. 10-2009-0034219

(51) Int. Cl.
*G02F 1/1333* (2006.01)
(52) U.S. Cl. ........................................ 349/58
(58) Field of Classification Search .............. 349/58, 349/60
See application file for complete search history.

(56) References Cited

U.S. PATENT DOCUMENTS

| | | | | |
|---|---|---|---|---|
| 5,499,129 A * | 3/1996 | Satou et al. | ...... | 349/58 |
| 6,147,724 A * | 11/2000 | Yoshii et al. | ...... | 349/62 |
| 7,929,075 B2 * | 4/2011 | Lee | ...... | 349/58 |
| 2002/0186333 A1 * | 12/2002 | Ha et al. | ...... | 349/58 |

FOREIGN PATENT DOCUMENTS

| | | |
|---|---|---|
| JP | 2002-040424 | 2/2002 |
| KR | 10-1998-0082343 | 12/1998 |
| KR | 10-2008-0045380 | 5/2008 |

* cited by examiner

*Primary Examiner* — Eric Wong
(74) *Attorney, Agent, or Firm* — Innovation Counsel LLP

(57) ABSTRACT

A display apparatus includes a display panel receiving a light to display an image in response to a driving signal, a driving circuit board applying the driving signal to the display panel, a backlight unit disposed under the display panel to provide the light to the display panel, a bottom chassis including a first chassis member and a second chassis member to receive the backlight unit after coupling the first chassis member to the second chassis member, and a top chassis disposed on the display panel and coupled to the bottom chassis in accordance with an embodiment. The driving circuit board is mounted on a rear surface of the bottom chassis, and the first and second chassis members are overlapped with each other in a region in which the driving circuit board is positioned.

18 Claims, 11 Drawing Sheets

DISPLAY APPARATUS

CROSS-REFERENCE TO RELATED APPLICATION

This application relies for priority upon Korean Patent Application No. 10-2009-0034219 filed on Apr. 20, 2009, the contents of which are herein incorporated by reference in its entirety.

BACKGROUND

1. Technical Field

One or more embodiments of the present invention generally relate to a display apparatus. More particularly, one or more embodiments of the present invention relate to a display apparatus capable of reducing a manufacturing cost thereof.

2. Related Art

In general, a liquid crystal display includes a liquid crystal display panel, a driving circuit part that drives the liquid crystal display panel, a backlight unit that supplies light to the liquid crystal display panel, and a chassis that receives the driving circuit part, the liquid crystal display panel, and the backlight unit. Thus, the driving circuit part, the liquid crystal display panel, and the backlight unit are combined with each other in the chassis. The chassis includes a bottom chassis that provides a receiving space into which the backlight unit is placed and a top chassis that is disposed on the liquid crystal display panel. The top chassis is coupled with the bottom chassis.

The bottom chassis is divided into two parts in order to more easily receive the backlight unit. However, it is difficult to firmly couple the two parts of the bottom chassis to each other without increasing manufacturing costs and adding process steps.

SUMMARY

One or more embodiments of the present invention provide a display apparatus capable of simplifying a manufacturing process and reducing a manufacturing cost thereof.

In one or more embodiments of the present invention, a display apparatus includes a display panel that receives a light to display an image in response to a driving signal, a driving circuit board that applies the driving signal to the display panel, a backlight unit disposed to face the display panel and provides the light to the display panel, a bottom chassis that includes a first chassis member and a second chassis member to receive the backlight unit, and a top chassis disposed on the display panel and coupled to the bottom chassis.

In one or more embodiments of the present invention, the first and second chassis members are coupled to each other. The driving circuit board is mounted on a rear surface of the bottom chassis, and the first and second chassis members are overlapped with each other in a region in which the driving circuit board is positioned.

In one or more embodiments of the present invention, the display apparatus may further include an insulating adhesive member overlapping with the first and second chassis members to couple the first and second chassis members to each other and to insulate the bottom chassis from parts mounted on the driving circuit board.

In one or more embodiments of the present invention, the first chassis member includes a first base plate and a first protruded portion protruding from the first base plate, and the second chassis member includes a second base plate and a second protruded portion protruding from the second base plate, where the first and second base plates are positioned to provide the same surface and the second protruded portion overlaps with the first protruded portion.

In one or more embodiments of the present invention, the first protruded portion may include a first contact portion substantially parallel to the first base plate, and the second protruded portion may include a second contact portion making contact with the first contact portion.

In one or more embodiments of the present invention, the first chassis member may further include an auxiliary contact portion overlapping with the first and second base plates, where a first end of the auxiliary contact portion is coupled to the first base plate, and a second end of the auxiliary contact portion is coupled to the second base plate.

In one or more embodiments of the present invention, the backlight unit may include at least one light source that generates the light, a light guide plate that is received in the bottom chassis and has at least one side surface adjacent to the light source to change a path of the light emitted from the light source, a light source holder that holds the light source, and a power supply line that is connected to the light source through the light source holder to apply an external power source to the light source.

In one or more embodiments of the present invention, the light source holder may be positioned adjacent to a side surface of the light guide plate, and the power supply line may be arranged substantially parallel to a sidewall of the bottom chassis, the sidewall of the bottom chassis vertically extended from an end of the rear surface of the bottom chassis.

Therefore, the first and second chassis members are overlapped with each other in a region in which the driving circuit board is mounted, so that the first and second chassis members may be connected with each other by the first and second protruded portions that support the driving circuit board. In addition, since the first and second chassis members are coupled to each other by the adhesive member that insulates the driving circuit board, an additional coupling member is not required, thereby reducing a manufacturing cost and improving productivity.

In addition, the power supply line electrically connected to the light source through the lamp holder is positioned between the sidewall of the bottom chassis and the top chassis, and thus the power supply line may not be exposed to the exterior of the display apparatus, to prevent the power supply line from being damaged by external impacts.

BRIEF DESCRIPTION OF THE DRAWINGS

The above and other embodiments of the present invention will become readily apparent by reference to the following detailed description when considered in conjunction with the accompanying drawings wherein.

DETAILED DESCRIPTION

Figure 1:
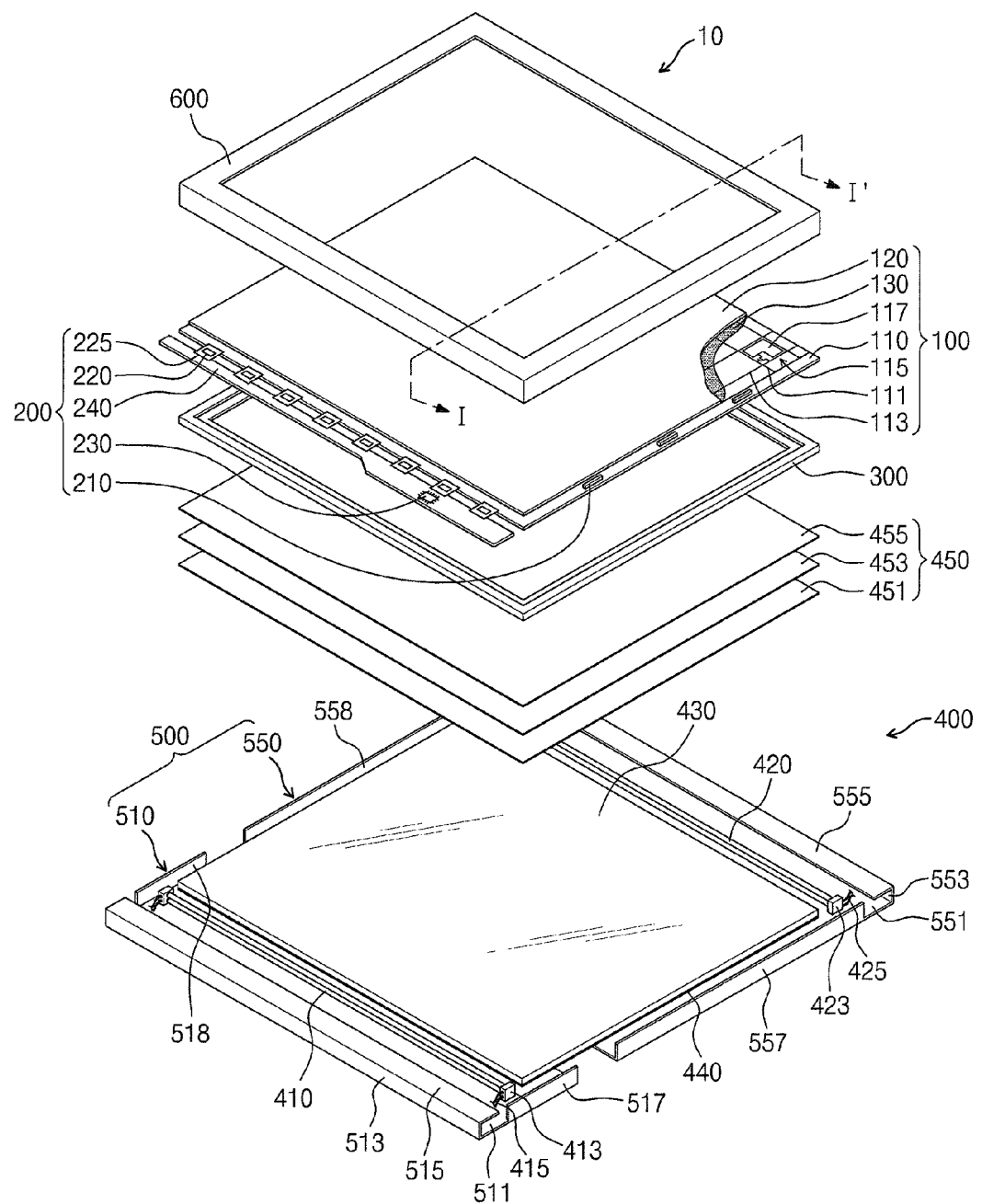
FIG. 1 is an exploded perspective view showing a display apparatus according to one or more embodiments of the present invention.

It will be understood that when an element or layer is referred to as being "on," "connected to" or "coupled to" another element or layer, it may be directly on, connected to or coupled to the other element or layer, or intervening elements or layers may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be further understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" or "beneath" may encompass both an orientation of above and below. The device may be otherwise oriented (rotated 90 degrees or at other orientations) and the spatially relative descriptors used herein may be interpreted accordingly.

The terminology used herein is for the purpose of describing particular embodiments of the present invention only and is not intended to be limiting of other embodiments of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as they are commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, one or more embodiments of the present invention will be explained in detail with reference to the accompanying drawings.

Figure 2:
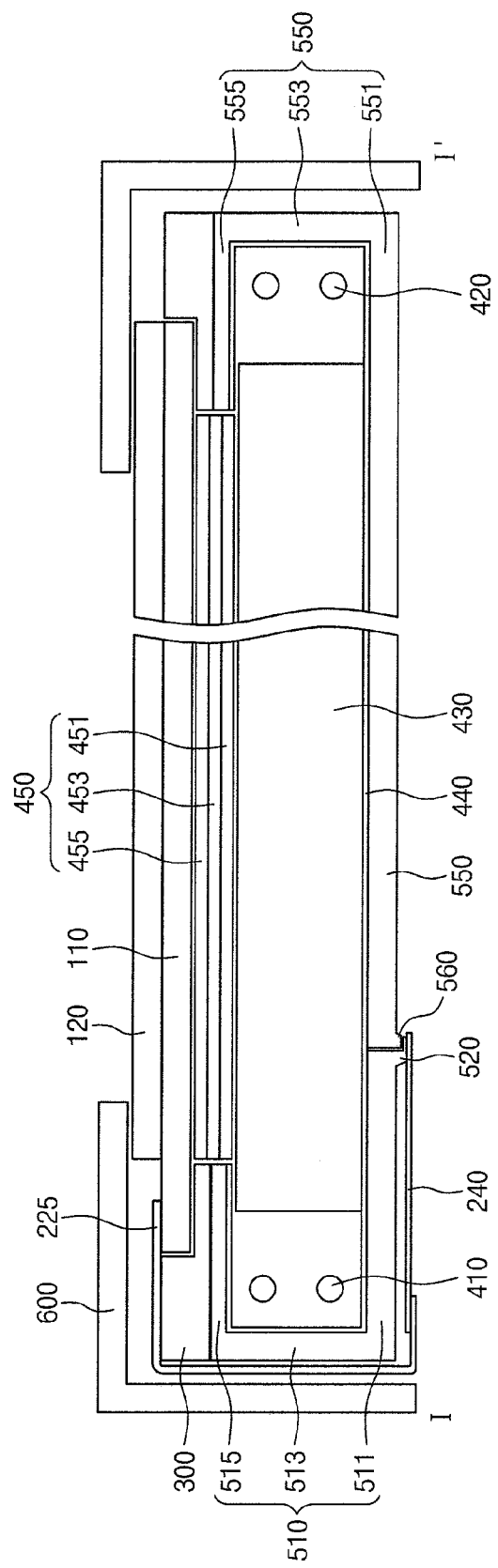
FIG. 2 is a cross-sectional view taken along a line I-I' of FIG. 1 according to one or more embodiments of the present invention.

FIG. 1 is an exploded perspective view showing a display apparatus according to one or more embodiments of the present invention, and FIG. 2 is a cross-sectional view taken along a line I-I' of FIG. 1 according to one or more embodiments of the present invention.

Referring to FIGS. 1 and 2, a display apparatus 10 includes a display panel 100, a driving circuit part 200, a mold frame 300, a backlight unit 400, a bottom chassis 500, and a top chassis 600.

The display panel 100 includes a thin film transistor substrate 110, a color filter substrate 120, and a liquid crystal layer 130 interposed between the thin film transistor substrate 110 and the color filter substrate 120 to control a light transmission amount between the two substrates.

The thin film transistor substrate 110 includes a first substrate made of glass or polymer material, a plurality of gate lines 111, a plurality of data lines 113, a plurality of thin film transistors 115, and a plurality of pixel electrodes 117, which are arranged on the first substrate. The plurality of gate lines 111 extend in a first direction and are arranged in a second direction substantially perpendicular to the first direction. The plurality of data lines 113 extend in the second direction and are arranged in the first direction to cross the plurality of gate lines 111. Each of the plurality of thin film transistors 115 is connected to a corresponding gate line of the plurality of gate lines 111 and a corresponding data line of the plurality of data lines 113. Each of the plurality of pixel electrodes 117 is connected to each of the plurality of thin film transistors 115 in a one-to-one correspondence. The color filter substrate 120 faces the thin film transistor 110 and may include a plurality of color filters (not shown), a plurality of black matrices (not shown), and a common electrode (not shown). However, the structure of the color filter substrate 120 should not be limited to the embodiment described, and in one or more embodiments of the present invention the plurality of color filters may be formed on the thin film transistor 110, not on the color filter substrate 120. Liquid crystal molecules of the liquid crystal layer 130 are aligned by an electric field generated by the plurality of pixel electrodes 117 and the common electrode, thereby controlling a transmission amount of light incident on the liquid crystal layer 130.

The driving circuit part 200 applies a driving signal to the display panel 100. The driving circuit part 200 includes a gate driver 210, a data driver 220, a timing controller 230, and a driving circuit board 240.

The gate driver 210 may be mounted on the display panel 100 and applies a driving signal to the plurality of gate lines 111. The data driver 220 may be mounted on a signal transmission member 225 that includes a plurality of signal transmission lines and connects the driving circuit board 240 to the display panel 100. The data driver 220 applies a driving signal to the plurality of data lines 113. The gate driver 210 and the data driver 220 are not limited to the above-described structures. In one or more embodiments of the present invention, the gate driver 210 may be directly formed on the display panel 100 through a thin film process, and the data driver 220 may be a plurality of chips that are mounted on the display panel 100. The timing controller 230 is mounted on the driving circuit board 240. The timing controller 230 applies control signals to the gate driver 210 and the data driver 220 and provides the data driver 220 with pixel data.

The driving circuit board 240 is electrically connected to the display panel 100 by the signal transmission member 225. The driving circuit board 240 includes the plurality of signal transmission lines and provides a region in which the timing controller 230 and various electrical parts are arranged. The driving circuit board 240 may further include a plurality of first holes (not shown) formed in a region in which the timing controller 230 and various electrical parts are not arranged. The driving circuit board 240 is mounted on a rear surface of the bottom chassis 500.

The mold frame 300 is disposed under the display panel 100 and receives the display panel 100 therein. The mold frame 300 protects the display panel 100 from external impacts.

The backlight unit 400 is disposed under the display panel 100 and supplies the light to the display panel 100. The backlight unit 400 includes a plurality of first lamps 410, a plurality of second lamps 420, a light guide plate 430, a reflection sheet 440, and an optical sheet 450.

The plurality of first lamps 410 and the plurality of second lamps 420 may have a bar shape and may be positioned adjacent to a first side of the display panel 100 and a second side of the display panel 100 opposite to the first side, respectively. The shape of the plurality of first and second lamps 410 and 420 and the number of the plurality of first and second lamps 410 and 420 are not limited particularly. The plurality of first lamps 410 are held by a pair of first lamp holders 413 and the plurality of second lamps 420 are held by a pair of second lamp holders 423. The first lamp holders 413 are positioned at both sides of the plurality of first lamps 410, and first power supply lines 415 are connected to the plurality of first lamps 410 through the first lamp holders 413. The second lamp holders 423 are positioned at both sides of the plurality of second lamps 420, and second power supply lines 425 are connected to the plurality of second lamps 420 through the second lamp holders 423.

The light guide plate 430 is disposed under the display panel 100. The light guide plate 430 includes a transparent polymer material such as polycarbonate, acryl resin, and so on. The light guide plate 430 receives the light emitted from the plurality of first and second lamps 410 and 420 through the first and second sides of the display panel 100, which are adjacent to the plurality of first and second lamps 410 and 420, respectively. The light guide plate 430 changes a path of the light to redirect it to the display panel 100.

The reflection sheet 440 is disposed between the light guide plate 430 and the bottom chassis 500. The reflection sheet 440 may include materials that reflect the light. The reflection sheet 440 reflects the light leaked through a lower surface of the light guide plate 430 to the display panel 100, thereby reducing the loss of the light provided to the display panel 100.

The optical sheet 450 is disposed on the light guide plate 430. The optical sheet 450 may include a plurality of sheets to improve the quality of the light provided to the display panel 100. In one or more embodiments of the present invention, the optical sheet 450 may include a diffusion sheet disposed on the light guide plate 430 to diffuse the light exiting from the light guide plate 430 and a prism sheet disposed on the diffusion sheet to condense the diffused light.

The bottom chassis 500 includes a first chassis member 510 and a second chassis member 550 to receive the backlight unit 400 therein. The bottom chassis 500 may be electrically connected to the driving circuit board 240 to reduce electromagnetic interference generated by the driving circuit part 200.

The first chassis member 510 includes a first base plate 511, a first sidewall 513, a first cover plate 515, and a first protruded portion 520. The first base plate 511 faces the display panel 100 and provides a receiving space for the light guide plate 430 and the reflection sheet 440. The first sidewall 513 extends from an end of the first base plate 511 corresponding to the first side of the display panel 100 in an upper direction substantially vertical to the display panel 100 and the first base plate 511. The first sidewall 513 may serve as a lamp cover that reflects the light emitted from the plurality of first lamps 410 to the light guide plate 430 in cooperation with the first base plate 511 and the first cover plate 515. The first cover plate 515 extends from the first sidewall 513 to face the first base plate 511, so that the first cover plate 515 partially overlaps with the light guide plate 430. That is, the first cover plate 515 overlaps with the plurality of first lamps 410 and a portion of the light guide plate 430, which is adjacent to the plurality of first lamps 410, thereby preventing the light from leaking through between the plurality of first lamps 410 and the light guide plate 430. Accordingly, the first cover plate 515 may reduce the loss of the light provided to the light guide plate 430.

The first chassis member 510 may further include a first guide sidewall 517 and a second guide sidewall 518, which are extended from the first base plate 511 in the upper direction (e.g. substantially vertical to the first base plate 511), so that the first chassis member 510 may prevent the light guide plate 430 from being separated from the first chassis member 510.

The second chassis member 550 includes a second base plate 551, a second sidewall 553, a second cover plate 555, and a second protruded portion 560. The second base plate 551 provides the receiving space in cooperation with the first base plate 511 in order to receive the light guide plate 430 and the reflection sheet 440. The second base plate 551 is positioned such that the first and second base plates 511 and 551 provide the same surface. The second sidewall 553 extends from an end of the second base plate 551 corresponding to the second side of the display panel 100 in the upper direction substantially vertical to the display panel 100 and the second base plate 551. The second sidewall 553 may serve as a lamp cover that reflects the light emitted from the plurality of second lamps 420 to the light guide plate 430 in cooperation with the second base plate 551 and the second cover plate 555.

The second cover plate 555 extends from the second sidewall 553 to face the second base plate 551, so that the second cover plate 555 partially overlaps with the light guide plate 430. That is, the second cover plate 555 overlaps with the plurality of second lamps 420 and a portion of the light guide plate 430, which is adjacent to the plurality of second lamps 420, thereby preventing the light from leaking through between the light guide plate 430 and the plurality of second lamps 420. Accordingly, the second cover plate 555 may reduce the loss of the light provided to the light guide plate 430.

The second chassis member 550 may further include a third guide sidewall 557 and a fourth guide sidewall 558, which are extended from the second base plate 551 in the upper direction (e.g. substantially vertical to the second base plate 551), so that the second chassis member 550 may prevent the light guide plate 430 from being separated from the second chassis member 550.

Although not shown in FIGS. 1 and 2, the reflection sheet 440 may be attached to the first and second chassis members 510 and 550. For instance, in case of the first chassis member 510, the reflection sheet 440 may be attached to at least one of the first base plate 511, the first sidewall 513, and the first cover plate 515. Similar to the first chassis member 510, the reflection sheet 440 may be attached to at least one of the second base plate 551, the second sidewall 553, and the second cover plate 555.

The top chassis 600 is disposed on the display panel 100 and covers end portions of the display panel 100 and the sides of the bottom chassis 500. The top chassis 600 is coupled with the bottom chassis 500.

Figure 3:
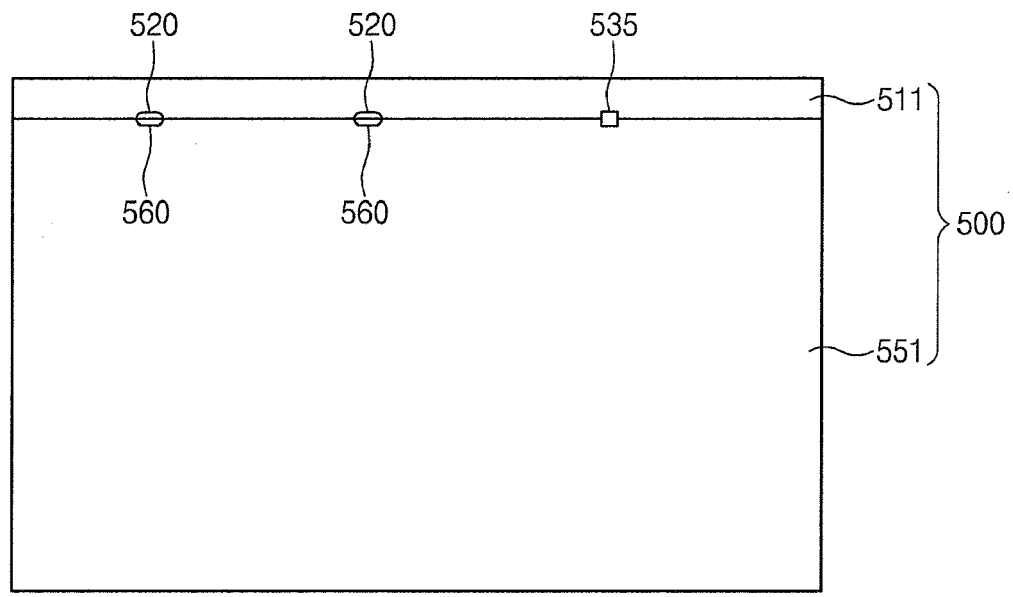
FIG. 3 is a plan view showing a rear surface of a bottom chassis according to one or more embodiments of the present invention.
Figure 4:
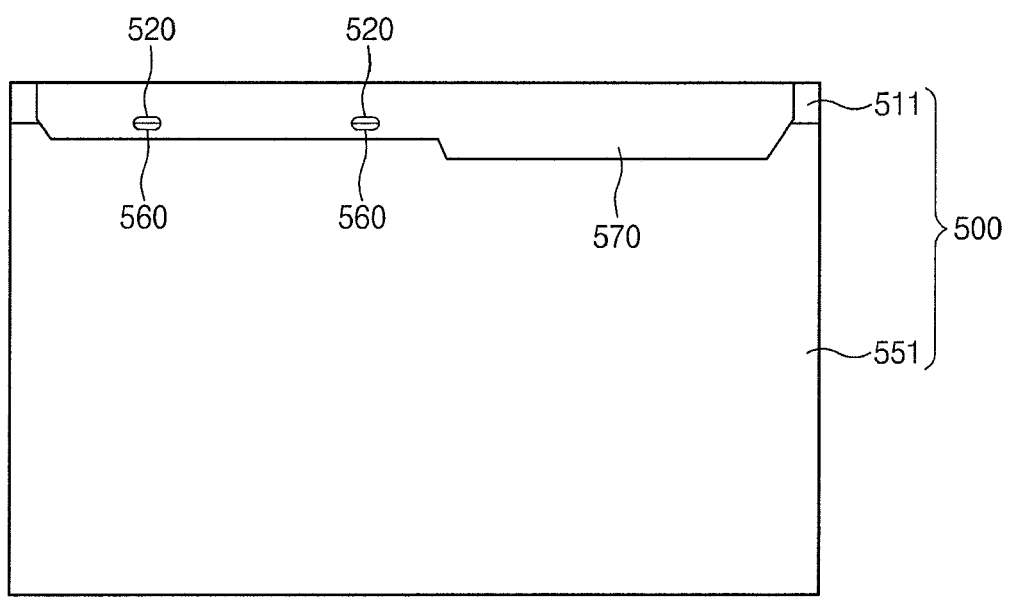
FIG. 4 is a plan view showing the rear surface of the bottom chassis after attaching an insulating adhesive member to the bottom chassis of FIG. 3 according to one or more embodiments of the present invention.
Figure 5:
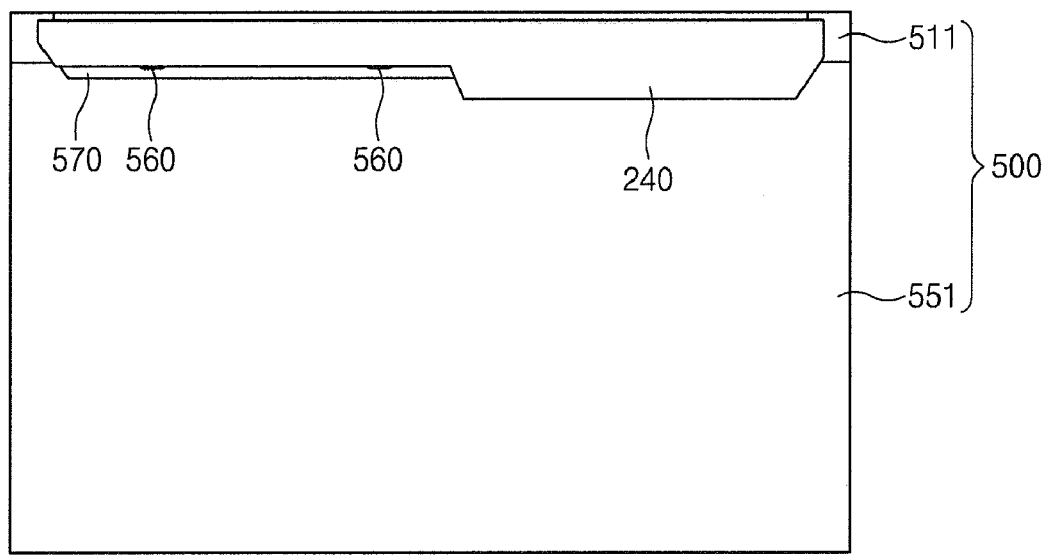
FIG. 5 is a plan view showing the rear surface of the bottom chassis after mounting a driving circuit board on the bottom chassis of FIG. 4 according to one or more embodiments of the present invention.

FIG. 3 is a plan view showing a rear surface of a bottom chassis according to one or more embodiments of the present invention, FIG. 4 is a plan view showing the rear surface of the bottom chassis after attaching an insulating adhesive member to the bottom chassis of FIG. 3 according to one or more embodiments of the present invention, and FIG. 5 is a plan view showing the rear surface of the bottom chassis after mounting a driving circuit board on the bottom chassis of FIG. 4 according to one or more embodiments of the present invention.

Referring to FIGS. 3 to 5, the bottom chassis 500 includes a first base plate 511 including the first protruded portion 520 and an auxiliary contact portion 535, and a second base plate 551 including the second protruded portion 560.

The first protruded portion 520 is positioned at an end of the first base plate 511 and is connected with the second protruded portion 560. The second protruded portion 560 is positioned at an end of the second base plate 551. The second protruded portion 560 has a shape corresponding to that of the first protruded portion 520.

The auxiliary contact portion 535 is coupled to the first base plate 511 and makes contact with the second base plate 551. The auxiliary contact portion 535 connects the first base plate 511 with the second base plate 551 in cooperation with the first protruded portion 520. The auxiliary contact portion 535 will be described in detail with reference to FIGS. 10 to 16.

As shown in FIG. 4, the bottom chassis 500 further includes an insulating adhesive member 570 that is attached to the first and second base plates 511 and 551 to fix the first and second base plates 511 and 551 to each other.

The insulating adhesive member 570 is attached to a portion of the first and second base plates 511 and 551 except for the first and second protruded portions 520 and 560. The insulating adhesive member 570 insulates the bottom chassis 500 from parts mounted on the driving circuit board 240 shown in FIG. 1.

As shown in FIG. 5, the driving circuit board 240 is mounted on the rear surface of the bottom chassis 500. The first and second base plates 511 and 551 are coupled to and overlapped with each other in a region in which the driving circuit board 240 is mounted. The first and second protruded portions 520 and 560 are overlapped with each other to support the driving circuit board 240. Detailed descriptions of the first and second protruded portions 520 and 560 will be described later with reference to FIGS. 6 to 9.

Figure 6:
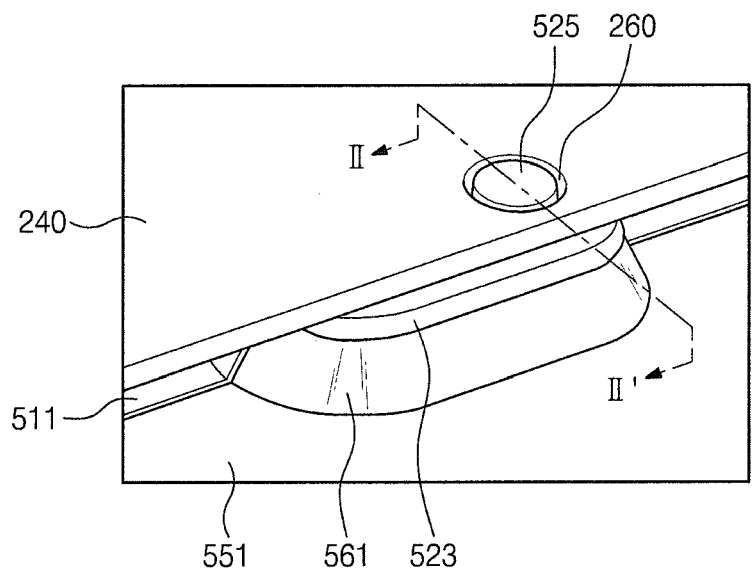
FIG. 6 is a perspective view showing a first embodiment of first and second protruded portions of FIGS. 3 to 5.

FIG. 6 is a perspective view showing a first embodiment of first and second protruded portions of FIGS. 3 to 5, and FIG. 7 is a cross-sectional view taken along a line II-II' of FIG. 6 according to one or more embodiments of the present invention. For the convenience of explanation, the insulating adhesive member 570 has been omitted in FIGS. 6 and 7, and detailed descriptions of the same elements as in FIGS. 3 to 5 will be omitted.

Figure 7:
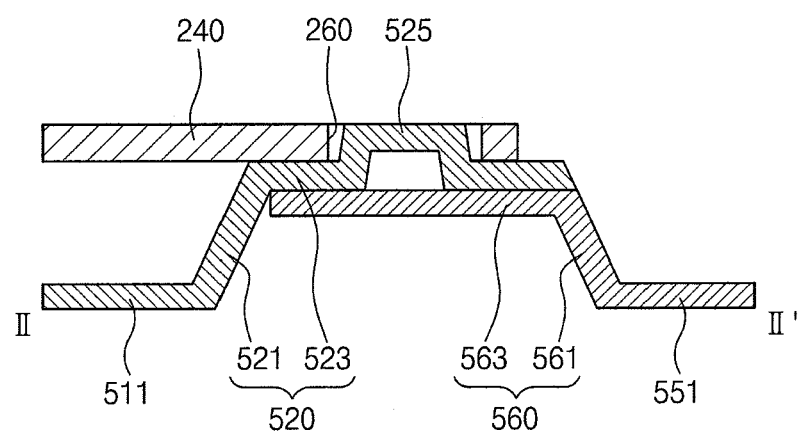
FIG. 7 is a cross-sectional view taken along a line II-II' of FIG. 6 according to one or more embodiments of the present invention.

Referring to FIGS. 6 and 7, the first protruded portion 520 is protruded from the first base plate 511. The first protruded portion 520 includes a first inclined portion 521 and a first contact portion 523. The first inclined portion 521 is inclined with respect to the first base plate 511. The first contact portion 523 has a step-difference with respect to the first base plate 511 and is substantially parallel to the first base plate 511.

The second protruded portion 560 is protruded from the second base plate 551. The second protruded portion 560 includes a second inclined portion 561 and a second contact portion 563. The second inclined portion 561 is inclined with respect to the second base plate 551. The second contact portion 563 has a step-difference with respect to the second base plate 551 and is substantially parallel to the second base plate 551.

The first contact portion 523 is positioned between the second contact portion 563 and the driving circuit board 240 and is electrically connected to the second contact portion 563. The first contact portion 523 supports the driving circuit board 240.

The first protruded portion 520 further includes a first fixing protrusion 525 that is protruded from the first contact portion 523 to the driving circuit board 240, and the driving circuit board 240 is provided with a first hole 260 into which the first fixing protrusion 525 is inserted. The first fixing protrusion 525 has a height corresponding to a thickness of the driving circuit board 240. The first fixing protrusion 525 is inserted into the first hole 260 to prevent movement of the driving circuit board 240.

Figure 8:
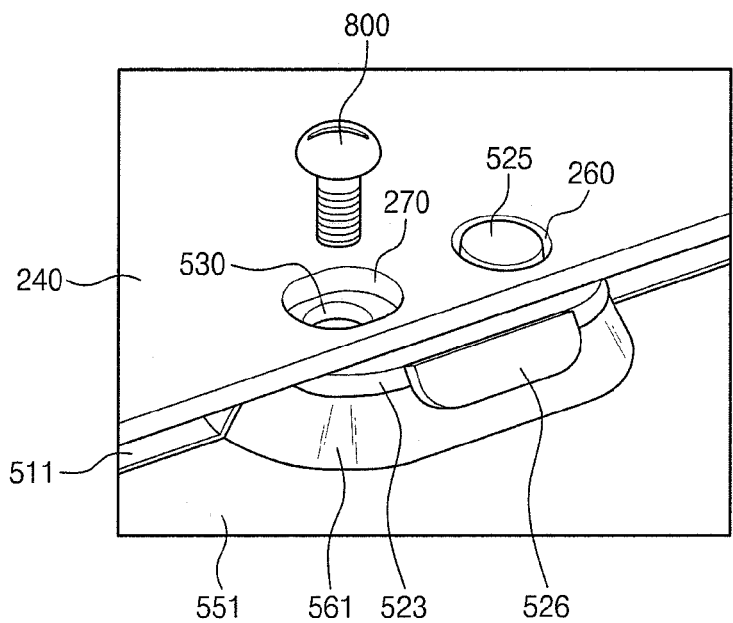
FIG. 8 is a perspective view showing a second embodiment of first and second protruded portions of FIGS. 3 to 5.

FIG. 8 is a perspective view showing a second embodiment of first and second protruded portions of FIGS. 3 to 5. In FIG. 8, for the convenience of explanation, the insulating adhesive member 570 has been omitted. In addition, in FIG. 8, the same reference numerals denote the same elements as in FIGS. 6 and 7, and thus detailed descriptions of the same elements will be omitted.

As shown in FIG. 8, the first protruded portion 520, the second protruded portion 560, and the driving circuit board 240 may be fixed by a fixing member 800 such as a screw. Therefore, the driving circuit board 240 further includes a second hole 270 positioned adjacent to the first hole 260, into which the fixing member 800 is inserted. Each of the first and second protruded portions 520 and 560 further includes a third hole 530 and a fourth hole (not shown), that are formed through the first and second contact portions 523 and 563, respectively. The fixing member 800 is inserted into the second hole 270, the third hole 530, and the fourth hole (not shown), so that the driving circuit board 240, the first protruded portion 520, and the second protruded portion 560 are fixed to each other.

The first protruded portion 520 may further include an alignment guide 526 extending from the first contact portion 523 and making contact with the second inclined portion 561. The alignment guide 526 increases the contact area between the first protruded portion 520 and the second protruded portion 560 and aligns the first protruded portion 520 with the second protruded portion 560.

Figure 9:
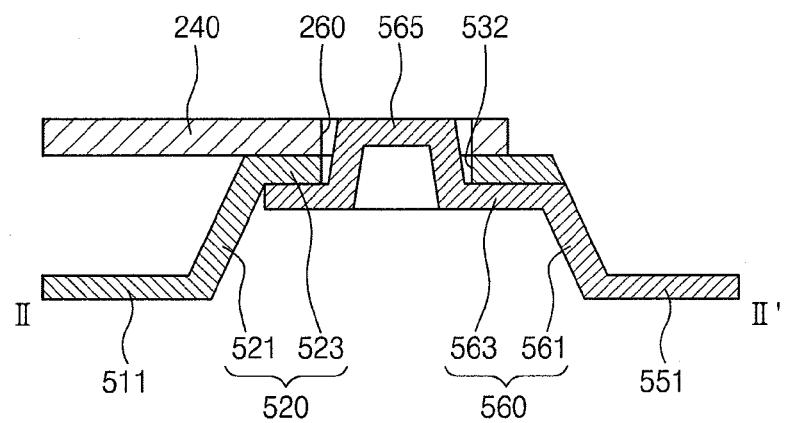
FIG. 9 is a cross-sectional view showing a third embodiment of first and second protruded portions of FIGS. 3 to 5.

FIG. 9 is a sectional view showing a third embodiment of first and second protruded portions of FIGS. 3 to 5. In FIG. 9, the same reference numerals denote the same elements as in FIGS. 6 and 7, and thus detailed descriptions of the same elements will be omitted.

Referring to FIG. 9, the first protruded portion 520 and the second protruded portion 560 are overlapped with and are also electrically connected to each other. Particularly, the first contact portion 523 is disposed between the second contact portion 563 and the driving circuit board 240 and is provided with a fifth hole 532 corresponding to the first hole 260 of the driving circuit board 240. The second protruded portion 560 further includes a second fixing protrusion 565 protruding from the second contact portion 563 that makes contact with the first contact portion 523. The second fixing protrusion 565 is inserted into the fifth hole 532 and the first hole 260 to prevent the movement of the driving circuit board 240 and the first contact portion 523.

Additionally, the driving circuit board 240, the first protruded portion 520, and the second protruded portion 560 may be fixed by the fixing member shown in FIG. 8.

Figure 10:
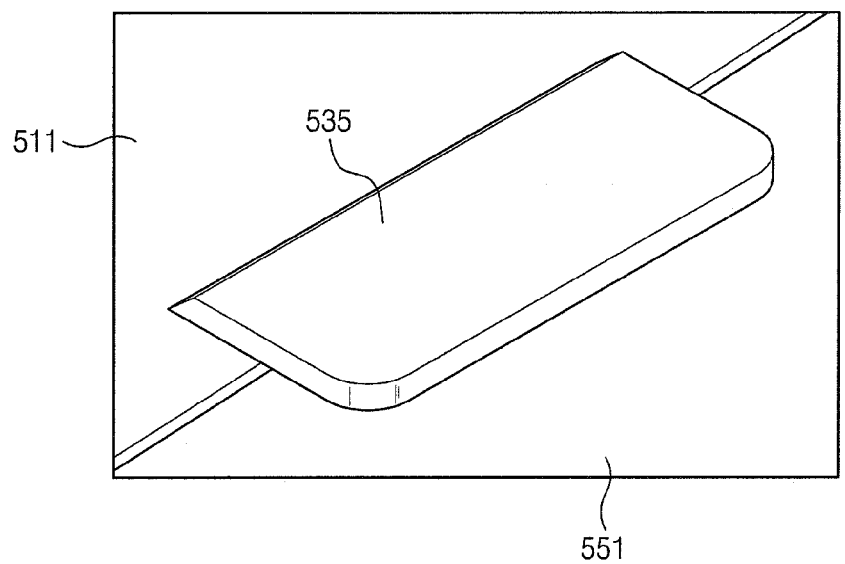
FIG. 10 is a perspective view showing a first embodiment of an auxiliary contact portion of FIG. 3.

FIG. 10 is a perspective view showing a first embodiment of an auxiliary contact portion of FIG. 3. In FIG. 10, the same reference numerals denote the same elements as in FIG. 3, and thus detailed descriptions of the same elements will be omitted.

Referring to FIG. 10, the auxiliary contact portion 535 has a rectangular-like shape and overlaps with portions of the first base plate 511 and the second base plate 551. The auxiliary contact portion 535 has a step-difference with respect to the first base plate 511, a first end of the auxiliary contact portion 535 is coupled to the first base plate 511, and a second end of the auxiliary contact portion 535 makes contact with the second base plate 551.

Figure 11:
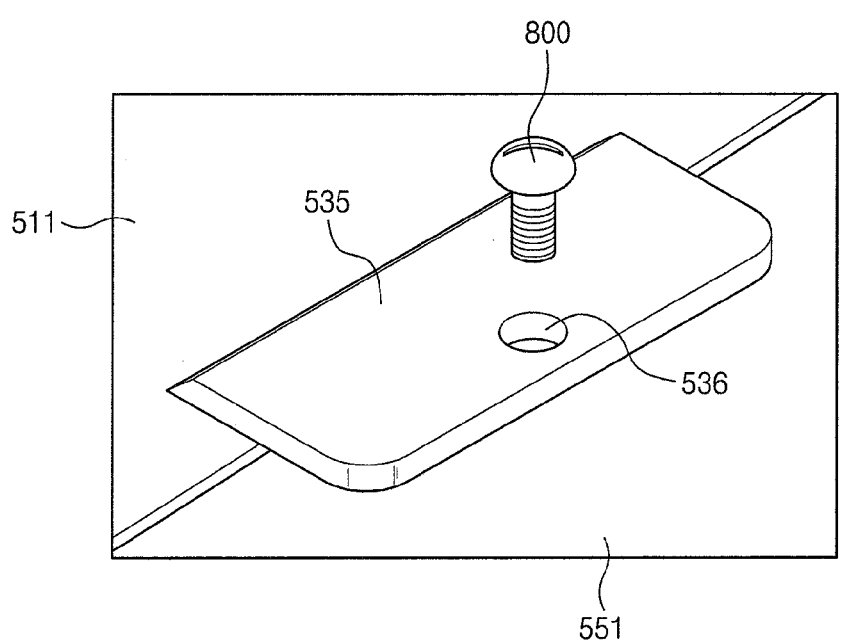
FIG. 11 is a perspective view showing a second embodiment of an auxiliary contact portion of FIG. 3.

FIG. 11 is a perspective view showing a second embodiment of an auxiliary contact portion of FIG. 3. In FIG. 11, the same reference numerals denote the same elements as in FIG. 10, and thus detailed descriptions of the same elements will be omitted.

Referring to FIG. 11, the auxiliary contact portion 535 is coupled to the second base plate 551 by the fixing member 800. Therefore, the auxiliary contact portion 535 further includes a sixth hole 536 into which the fixing member 800 is inserted, and the second base plate 551 further includes a seventh hole (not shown) corresponding to the sixth hole 536, into which the fixing member 800 is inserted. The fixing member 800 is inserted into the sixth hole 536 and the seventh hole (not shown) to fix the auxiliary contact portion 535 and the second base plate 551 to each other.

Figure 12:
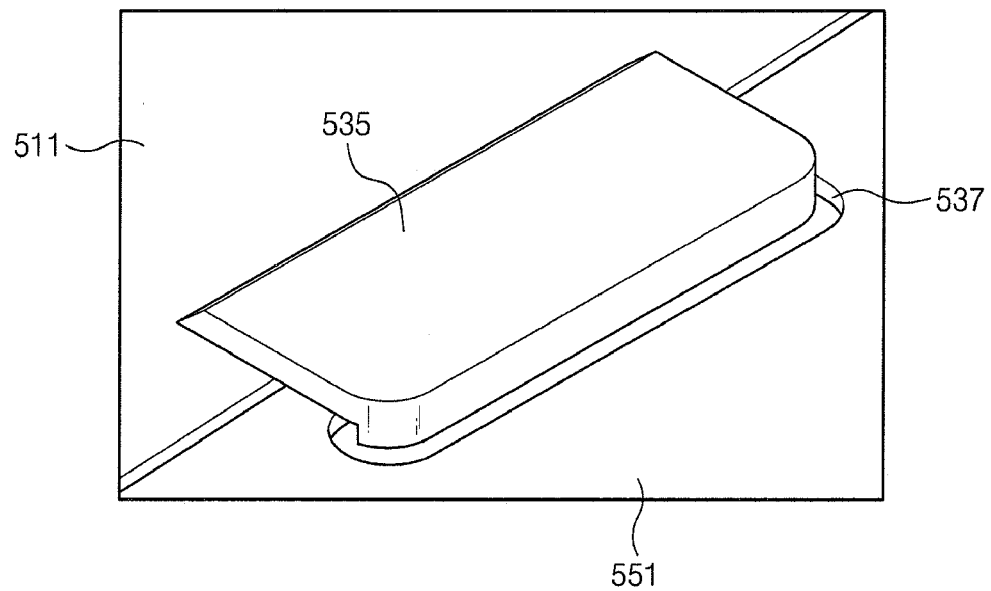
FIG. 12 is a perspective view showing a third embodiment of an auxiliary contact portion of FIG. 3.

FIG. 12 is a perspective view showing a third embodiment of an auxiliary contact portion of FIG. 3. In FIG. 12, the same reference numerals denote the same elements as in FIG. 3, and thus detailed descriptions of the same elements will be omitted.

Referring to FIG. 12, the auxiliary contact portion 535 has a rectangular-like shape and overlaps with portions of the first and second base plates 511 and 551. The auxiliary contact portion 535 has a step-difference with respect to the first base plate 511, a first end of the auxiliary contact portion 535 is coupled to the first base plate 511, and a second end of the auxiliary contact portion 535 is bent toward the direction that is substantially vertical to the second base plate 551. The second base plate 551 further includes an eighth hole 537 into which the second end of the auxiliary contact portion 535 is inserted. In one or more embodiments of the present invention, the eighth hole 537 has a shape extended in a direction substantially parallel to the end of the first base plate 511.

Thus, the auxiliary contact portion 535 may prevent the first and second base plates 511 and 551 from being separated from each other.

Figure 13:
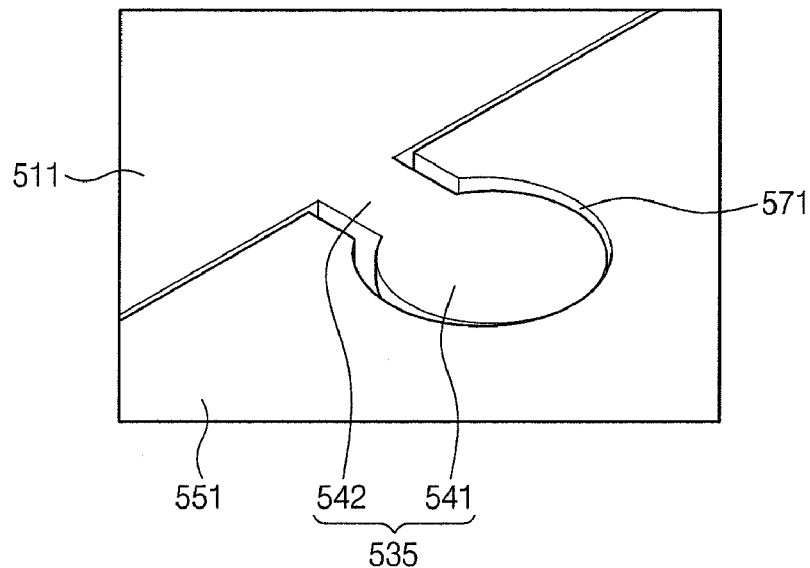
FIG. 13 is a perspective view showing a fourth embodiment of an auxiliary contact portion of FIG. 3.
Figure 14:
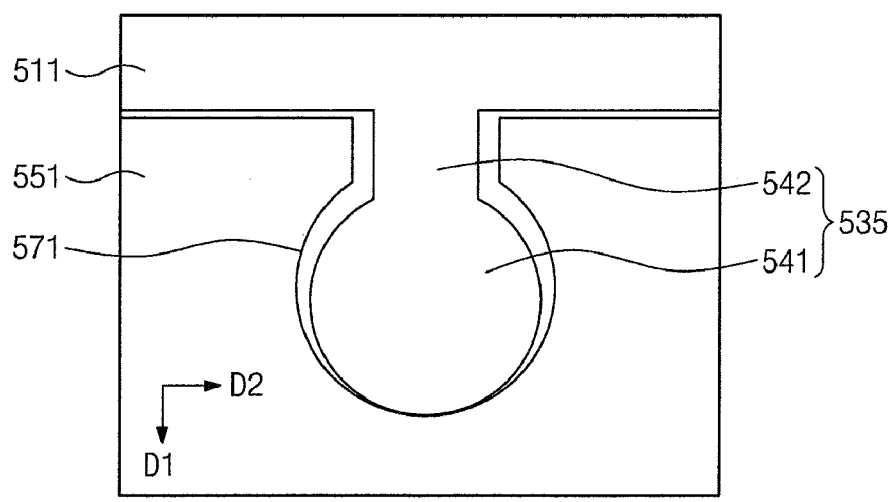
FIG. 14 is a plan view showing the auxiliary contact portion of FIG. 13 according to one or more embodiments of the present invention.

FIG. 13 is a perspective view showing a fourth embodiment of an auxiliary contact portion of FIG. 3, and FIG. 14 is a plan view showing the auxiliary contact portion of FIG. 13 according to one or more embodiments of the present invention. In FIGS. 13 and 14, the same reference numerals denote the same elements as in FIG. 3, and thus detailed description of the same elements will be omitted.

Referring to FIGS. 13 and 14, the auxiliary contact portion 535 extends in a first direction D1 from the end of the first base plate 511. The auxiliary contact portion 535 includes a first auxiliary contact portion 541 having a circular-like shape and a second auxiliary contact portion 542 connecting the first auxiliary contact portion 541 with the first base plate 511. The second auxiliary contact portion 542 has a width narrower than that of the first auxiliary contact portion 541. The shape of the first auxiliary contact portion 541 should not be limited to the embodiment described. That is, in one or more embodiments of the present invention, the first auxiliary contact portion 541 may have an oval-like shape or a polygonal shape.

The second base plate 551 is partially removed to further include a receiving hole 571 formed by recessing the end of the second base plate 551. The receiving hole 571 has a shape corresponding to the auxiliary contact portion 535 to receive the first and second auxiliary contact portions 541 and 542. The first auxiliary contact portion 541 received in the receiving hole 571 makes contact with the second base plate 551.

Thus, the auxiliary contact portion 535 is positioned in the receiving hole 571, thereby preventing movement of the first and second base plates 511 and 551 in the first and second directions D1 and D2.

Figure 15:
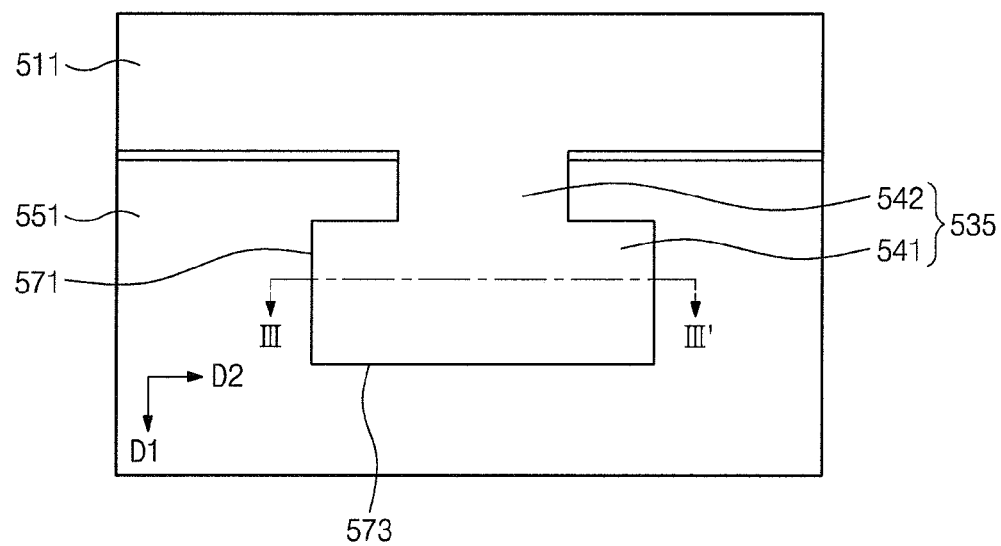
FIG. 15 is a plan view showing a fifth embodiment of an auxiliary contact portion of FIG. 3.
Figure 16:
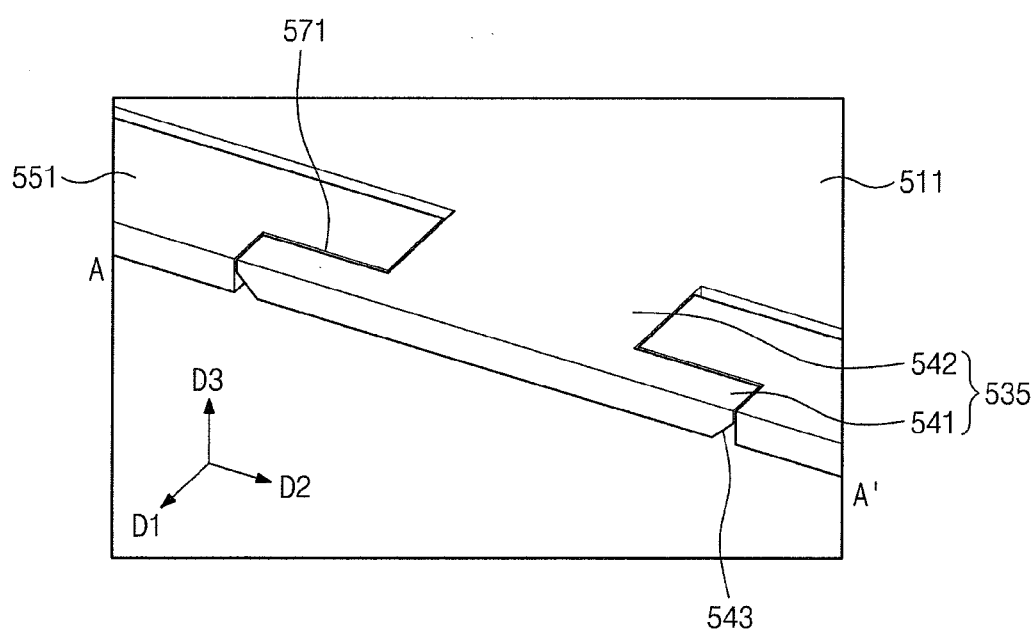
FIG. 16 is a perspective view showing a section taken along a line III-III' of FIG. 15 according to one or more embodiments of the present invention.

FIG. 15 is a plan view showing a fifth embodiment of an auxiliary contact portion of FIG. 3, and FIG. 16 is a perspective view showing a section taken along a line III-III' of FIG. 15 according to one or more embodiments of the present invention. In FIGS. 15 and 16, the same reference numerals denote the same elements as in FIG. 3, and thus detailed descriptions of the same elements will be omitted.

Referring to FIGS. 15 and 16, the auxiliary contact portion 535 extends in a first direction D1 from the end of the first base plate 511 to the second base plate 551. The auxiliary contact portion 535 includes a first auxiliary contact portion 541 having a rectangular-like shape and a second auxiliary contact portion 542 that connects the first auxiliary contact portion 541 with the first base plate 511. The second auxiliary contact portion 542 has a width narrower than a width of the first auxiliary contact portion 541 in a second direction D2 that is substantially perpendicular to the first direction D1 when viewed in a plan view.

As shown in FIG. 16, both corners of the first auxiliary contact portion 541, which are positioned at relatively lower positions in a third direction D3 vertically perpendicular to the first and second directions D1 and D2 when the first auxiliary contact portion 541 is coupled to the second base plate 551, have a tapered shape.

The second base plate 551 further includes a receiving hole 571 corresponding to the shape of the auxiliary contact portion 535. That is, the receiving hole 571 has the shape corresponding to the outline of the auxiliary contact portion 535 to receive the first and second auxiliary contact portions 541 and 542 therein. The first and second auxiliary contact portions 541 and 542 are coupled with the second base plate 551 such that the first and second auxiliary contact portions 541 and 542 received in the receiving hole 571 make contact with the second base plate 551.

Thus, the auxiliary contact portion 535 may prevent the first and second base plates 511 and 551 from being moved in the first, second, and third directions D1, D2, and D3 by the first and second auxiliary contact portions 541 and 542.

Figure 17:
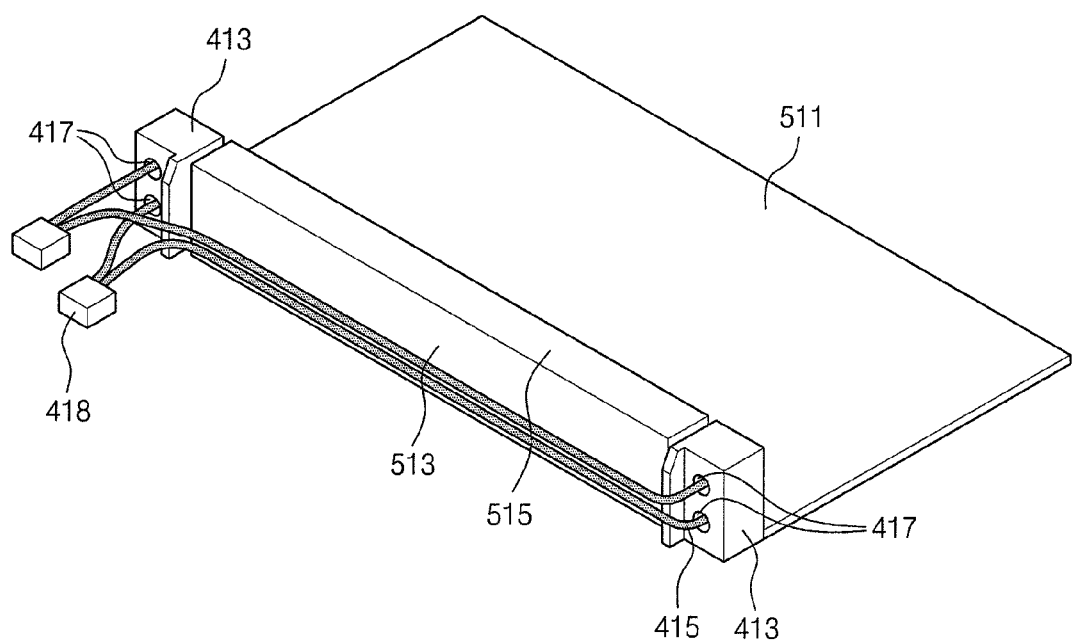
FIG. 17 is a perspective view showing a lamp holder and a power source line according to one or more embodiments of the present invention.

FIG. 17 is a perspective view showing a lamp holder and a power source line according to one or more embodiments of the present invention. In FIG. 17, the same reference numerals denote the same elements as in FIG. 1, and thus detailed descriptions of the same elements will be omitted. Particularly, in FIG. 17, the first lamp holders 413, the first power supply lines 415, and the first chassis member including the first base plate 511, the first sidewall 513, and the first cover plate 515 have been shown.

Referring to FIG. 17, the first lamp holders 413 are positioned at both ends of the plurality of first lamps received in the first chassis member to hold the plurality of first lamps. The first lamp holders 413 are coupled with the first power supply lines 415 that supply the power source voltage to the plurality of first lamps. In particular, the first lamp holders 413 are provided with draw holes 417 formed therethrough, and the power source lines 415 are electrically connected to the plurality of first lamps through the withdraw holes 417.

The first ends of the first power supply lines 415 are electrically connected to the plurality of first lamps through the withdraw holes 417 and the second ends of the first power supply lines 415 are connected to a connector 418. The first power supply lines 415 are arranged along the first sidewall 513. In addition, the first power supply lines 415 are positioned between the first sidewall 513 and the top chassis 600 (refer to FIG. 1), so that the first power supply lines 415 are not exposed to the exterior of the display apparatus. Accordingly, the first power supply lines 415 may be prevented from being damaged from external impacts.

Although one or more embodiments of the present invention have been described, it is understood that embodiments of the present invention should not be limited to these embodiments described, but that various changes and modifications may be made by one of ordinary skill in the art and be included within the spirit and scope of the present invention as hereinafter claimed.

What is claimed is:

1. A display apparatus comprising:
    a display panel adapted to receive a light to display an image in response to a driving signal;
    a driving circuit board adapted to apply the driving signal to the display panel;
    a backlight unit disposed to face the display panel and adapted to provide the light to the display panel;
    a bottom chassis comprising a first chassis member and a second chassis member adapted to receive the backlight unit on a front surface of the bottom chassis, wherein the first and second chassis members are coupled to each other; and
    a top chassis disposed on the display panel and coupled to the bottom chassis,
    wherein the driving circuit board is mounted on a rear surface of the bottom chassis opposite the front surface, and the first and second chassis members are overlapped with each other in a region in which the driving circuit board is positioned.

2. The display apparatus of claim 1, further comprising an insulating adhesive member that overlaps with the first and second chassis members to couple the first and second chassis members to each other and to insulate the bottom chassis from parts mounted on the driving circuit board.

3. The display apparatus of claim 1, wherein the first chassis member comprises a first base plate and a first protruded portion protruding from the first base plate, and the second chassis member comprises a second base plate and a second protruded portion protruding from the second base plate, wherein the first and second base plates are positioned to provide the same surface and the second protruded portion overlaps with the first protruded portion.

4. The display apparatus of claim 3, wherein the first protruded portion comprises a first contact portion, wherein the first contact portion is substantially parallel to the first base plate, and the second protruded portion comprises a second contact portion that contacts the first contact portion.

5. The display apparatus of claim 4, wherein the first protruded portion further comprises a first fixing protrusion protruding from the first contact portion in a direction substantially perpendicular to the first base plate, and the driving circuit board further comprises a first hole into which the first fixing protrusion is inserted.

6. The display apparatus of claim 4, wherein the second protruded portion further comprises a second fixing protrusion protruding from the second contact portion in a direction substantially perpendicular to the second base plate, and the driving circuit board further comprises a first hole into which the second fixing protrusion is inserted.

7. The display apparatus of claim 6, wherein the first contact portion comprises a second hole into which the second fixing protrusion is inserted.

8. The display apparatus of claim 3, wherein the first protruded portion and the second protruded portion are coupled to each other by a fixing member.

9. The display apparatus of claim 8, wherein each of the first protruded portion and the second protruded portion further comprises a third hole into which the fixing member is inserted.

10. The display apparatus of claim 3, wherein the first chassis member further comprises an auxiliary contact portion that overlaps with the first and second base plates, wherein a first end of the auxiliary contact portion is coupled to the first base plate, and a second end of the auxiliary contact portion is coupled to the second base plate.

11. The display apparatus of claim 10, wherein the auxiliary contact portion and the second base plate are coupled to each other by a fixing member, and each of the auxiliary contact portion and the second base plate further comprises a fourth hole into which the fixing member is inserted.

12. The display apparatus of claim 3, wherein the first chassis member further comprises an auxiliary contact member that overlaps with the first and second base plates, wherein a first end of the auxiliary contact member is coupled to the first base plate, and a second end of the auxiliary contact member is bent to a direction that is substantially vertical to the second base plate.

13. The display apparatus of claim 12, wherein the second chassis member further comprises a fifth hole formed through the second base plate such that the second end of the auxiliary contact member is inserted into the fifth hole.

14. The display apparatus of claim 3, wherein the first chassis member further comprises an auxiliary contact portion that extends to the second base plate from an end of the first base plate, and the second chassis member further comprises a receiving hole formed by recessing an end, which is adjacent to the end of the first base plate, of the second base plate to receive the auxiliary contact portion, wherein the receiving hole has a shape corresponding to the auxiliary contact portion.

15. The display apparatus of claim 1, wherein the backlight unit comprises:
  at least one light source adapted to generate the light;
  a light guide plate that is received in the bottom chassis and has at least one side surface adjacent to the light source adapted to change a path of the light emitted from the light source;
  a light source holder adapted to hold the light source; and
  a power supply line adapted to connect to the light source through the light source holder to apply an external power source to the light source.

16. The display apparatus of claim 15, wherein the light source holder is positioned adjacent to a side surface of the light guide plate, and the power supply line is arranged substantially parallel to a sidewall of the bottom chassis, wherein the sidewall is vertically extended from an end of the rear surface of the bottom chassis.

17. The display apparatus of claim 1, wherein the region is opposite to the display panel and the backlight unit.

18. The display apparatus of claim 1, wherein the first and second chassis members are coupled in the region.

* * * * *